United States Patent
Brems

[11] 3,938,396
[45] Feb. 17, 1976

[54] PROGRAMMABLE MULTIPLE STEP INDEXING DRIVE MECHANISM

[76] Inventor: John Henry Brems, 32867 White Oaks Trail, Birmingham, Mich. 48010

[22] Filed: Sept. 26, 1974

[21] Appl. No.: 509,407

[52] U.S. Cl. .................................. 74/55; 74/56
[51] Int. Cl.² ........................................ F16H 25/08
[58] Field of Search .......... 74/27, 29, 422, 142, 54, 74/55, 56, 57, 44

[56] References Cited
UNITED STATES PATENTS
| | | | |
|---|---|---|---|
| 2,687,649 | 8/1954 | Seragnoli | 74/44 |
| 3,364,756 | 1/1968 | Daniele | 74/55 |
| 3,789,676 | 2/1974 | Brems | 74/27 |

Primary Examiner—Kenneth W. Sprague
Assistant Examiner—James G. Yeung
Attorney, Agent, or Firm—Barnes, Kisselle, Raisch & Choate

[57] ABSTRACT

A multiple step indexing mechanism having a rotary input and a rotary output and intermediate driving members with driving connections to generate a periodic dwell interval of the output member through the kinematic superposition of substantially linear and substantially harmonic motion components including those which include multiple harmonic components together with a dwell extension mechanism which includes timing means driven by the input member, a device for engaging and disengaging one of the driving connections, and a connection between the timing means and engagement device to effect disengagement within one of the periodic dwell intervals and reengagement within another of the periodic dwell intervals.

7 Claims, 13 Drawing Figures

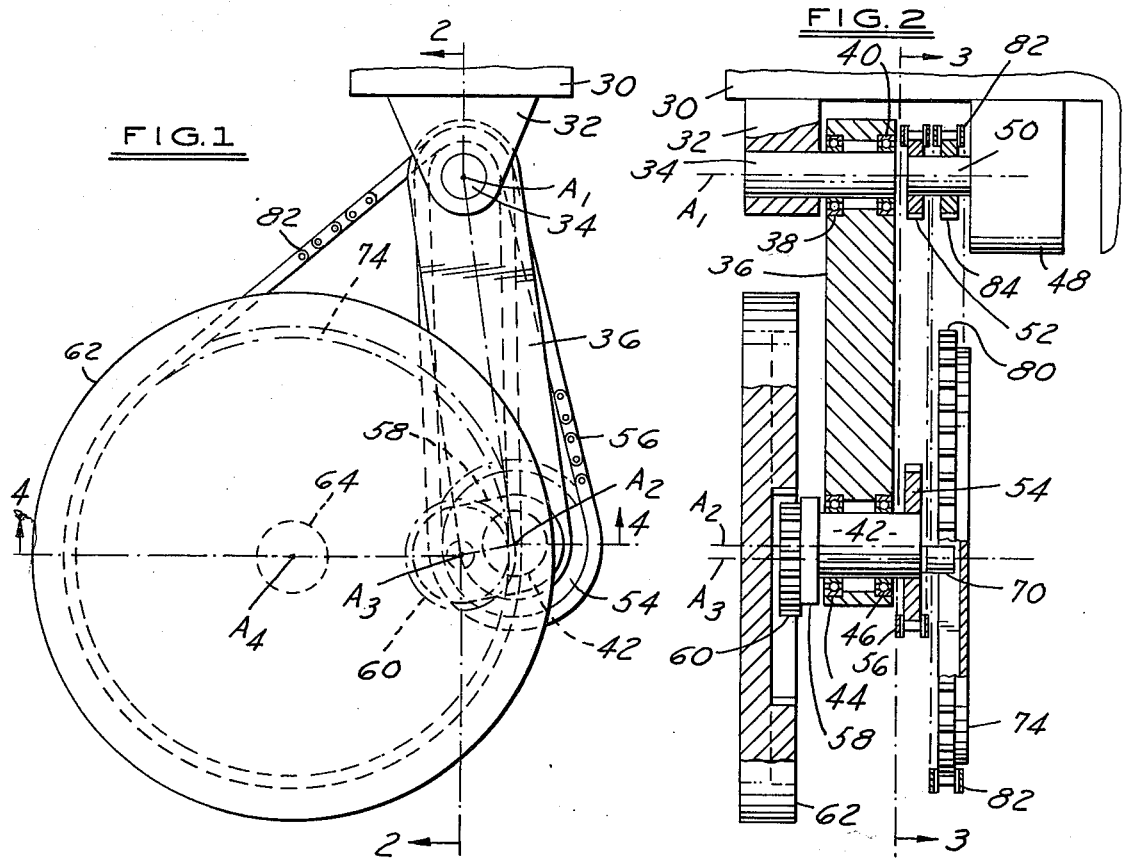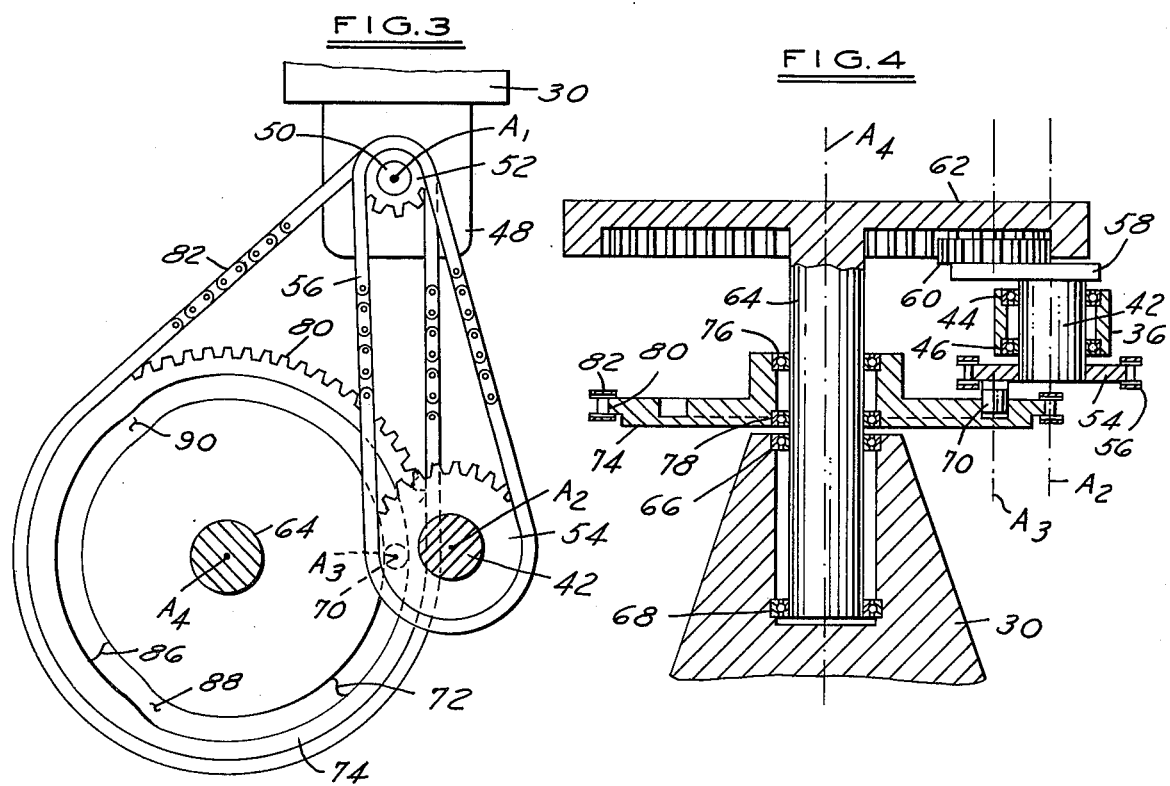

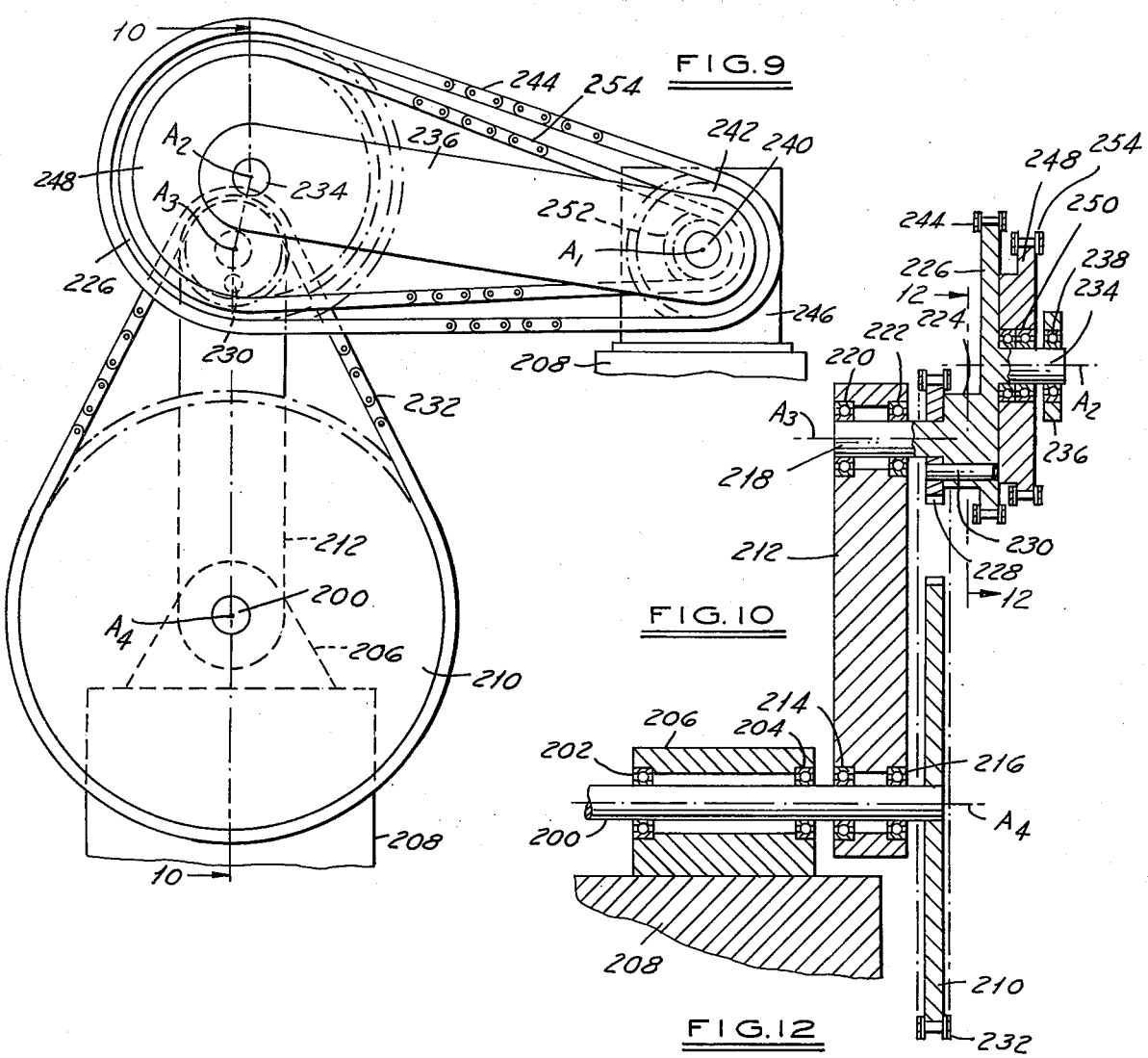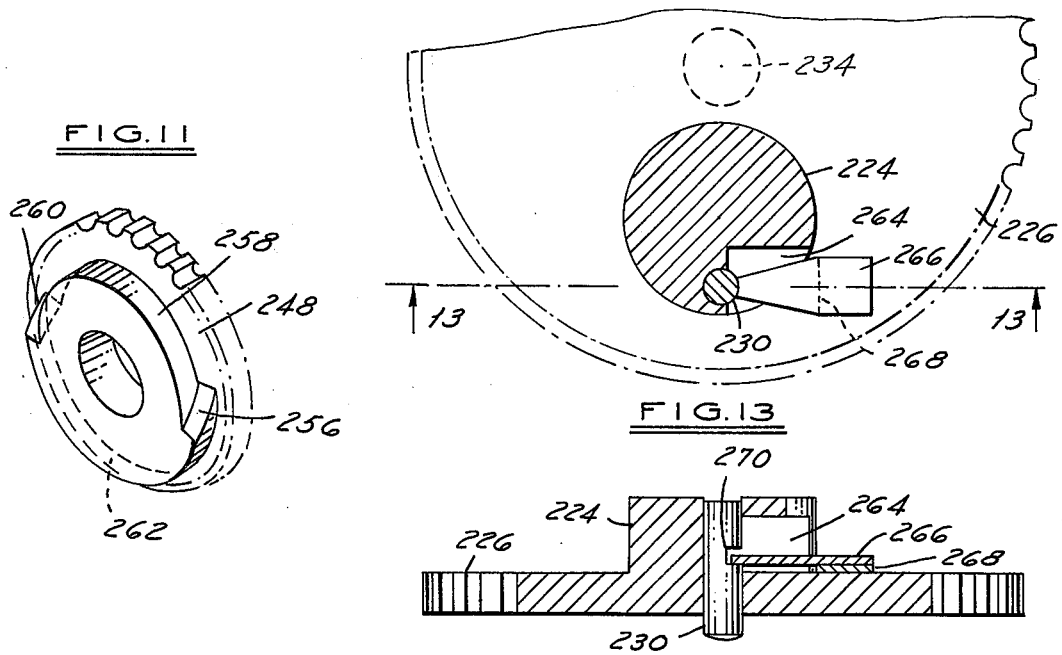

PROGRAMMABLE MULTIPLE STEP INDEXING DRIVE MECHANISM

This invention relates to a Programmable Multiple Step Indexing Drive Mechanism.

It is an object of this invention to achieve a significant increase in the dwell period of certain types of indexing mechanisms whose normal dwell period is less than half of a given index plus dwell period.

It is a further object of this invention to provide a system in which the dwell index intervals may be programmed in a non-repetitive sequence over a small number of intervals.

It is a further object of this invention to achieve the aforesaid dwell period extensions without disturbing the excellent inherent smoothness and absence of shock characterizing the unmodified mechanisms.

Other objects and features of this invention relating to details of construction and operation will be apparent in the following description and claims in which is set forth the principles of operation and use of the invention together with several of the preferred modes presently contemplated for the practice of thereof.

DRAWINGS accompany the disclosure and the various views thereof may be briefly described as follows:

FIG. 1, a side view of a first embodiment of the invention.

FIG. 2, a sectional view on line 2—2 of FIG. 1.

FIG. 3, a sectional view on line 3—3 of FIG. 2.

FIG. 4, a sectional view on line 4—4 of FIG. 1.

Figure 5:
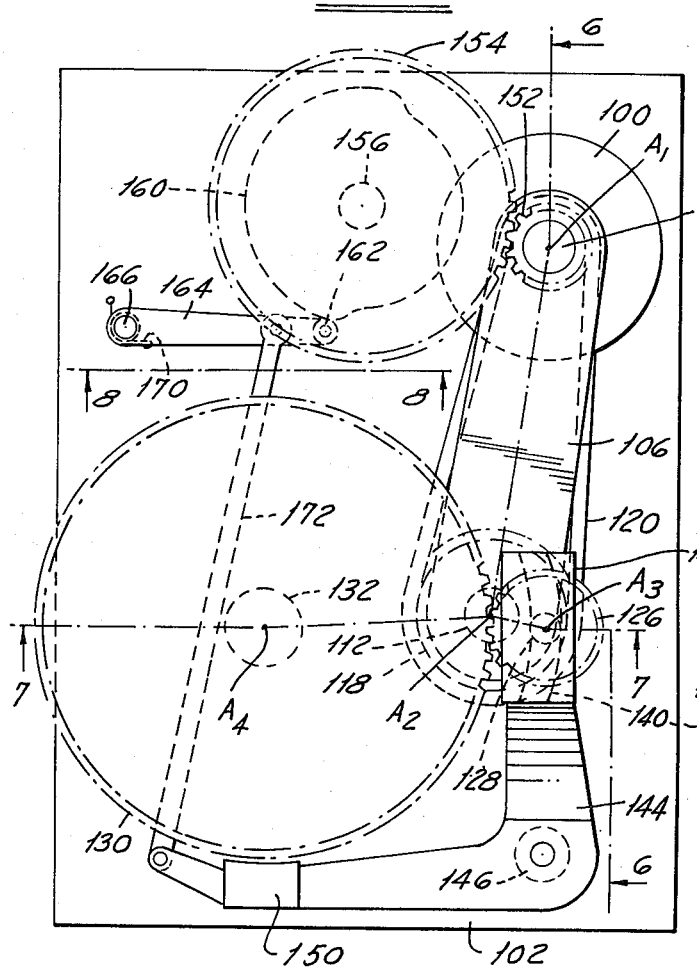

FIG. 5, a side view of a modified structure with the programming cam on a separate fixed axis.

Figure 6:
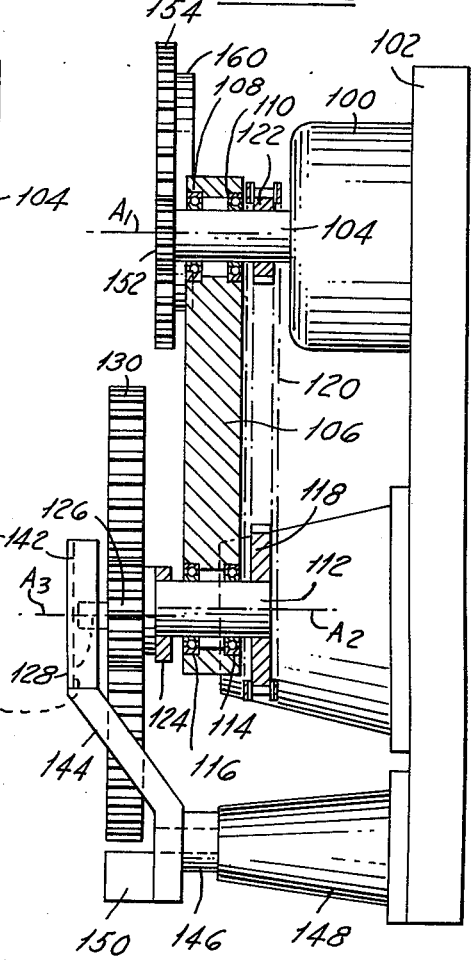

FIG. 6, a sectional view on line 6—6 of FIG. 5.

Figure 7:
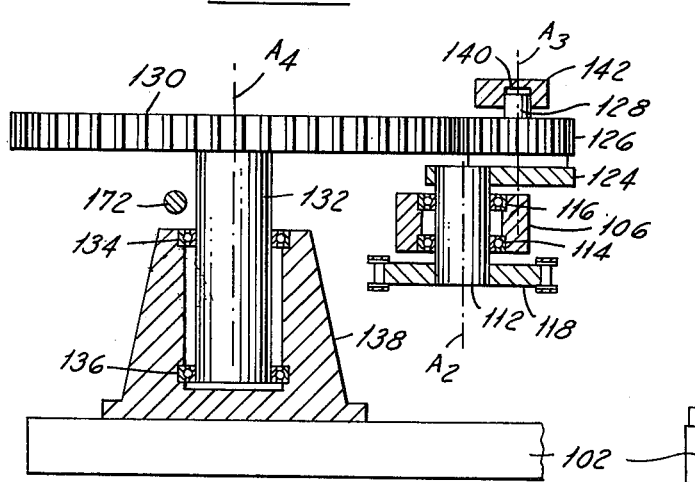

FIG. 7, a sectional view on line 7—7 of FIG. 5.

Figure 8:
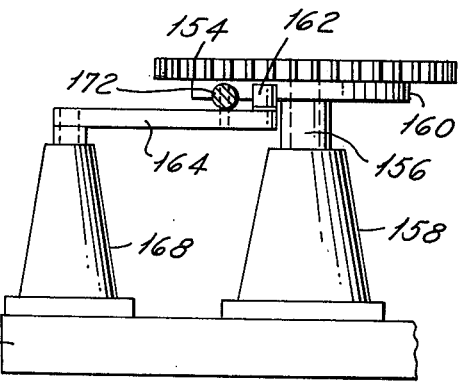

FIG. 8, a sectional view on line 8—8 of FIG. 5.

FIG. 9, a side view of a third embodiment in which the output motion is generated by a system of chains and sprockets.

FIG. 10, a sectional view on line 10—10 of FIG. 9.

FIG. 11, a perspective view of a shifting means.

FIG. 12, a sectional view on line 12—12 of FIG. 10.

FIG. 13, a sectional view on line 13—13 of FIG. 12.

In certain types of indexing systems the substantially constant velocity of an input member is converted into an intermittent movement of an output member which reaches a periodic full dwell or stopped condition, through the utilization of constant mesh circular gears or equivalent sprockets and chains or pulleys and belts. This periodic dwell is achieved through specific arrangements of these components and the moving elements on which they are mounted. A family of such intermittent motion mechanisms is shown in my invention in U.S. Pat. No. 3,789,676. Other families of such mechanisms are described in my U.S. Patent applications, Ser. No. 444,024, filed Feb. 20, 1974, and Ser. No. 474,947, filed May 31, 1974.

Mechanisms of this general type can, with the proper choice of the governing geometric parameters, achieve a periodic output dwell or stop of the output member even though the input member continues to rotate. The order of magnitude of the fraction of a total index period occupied by such a dwell is 1/3 to 1/30 of a complete index cycle; i.e., if the input rotates at a constant velocity, the output will be substantially stationary for 1/3 to 1/30 of the time required to complete an entire cycle which consists of the movement time plus the dwell time. Such a dwell is a natural dwell since it is an outgrowth of the natural properties of the mechanism.

However, many applications arise in which this natural dwell is not sufficiently long. Some cases demand a dwell which consists of 9/10 or even more of the entire cycle time; i.e., the dwell is nine times longer than the time required to accomplish the index proper.

The invention described below defines a simple addition to the parent mechanism which permits a multifold extension of the dwell without disturbing the inherent smoothness of acceleration and deceleration characteristics of the basic mechanism.

REFERRING TO THE DRAWINGS, in FIGS. 1, 2, 3 and 4, a frame 30 supports a bracket 32 which in turn supports a shaft 34 located on an axis $A_1$. A link 36 is pivoted on shaft 34 through bearings 38 and 40; the other end of link 36 rotatably supports a shaft 42 on axis $A_2$ through bearings 44 and 46.

A prime mover 48 mounted on the frame 30 has an output shaft 50 which also rotates on the axis $A_1$; a sprocket 52 is mounted on the shaft 50 and drives a sprocket 54 mounted on shaft 42 on axis $A_2$ through a suitably formed chain 56.

At its other end the shaft 42 supports a cheek plate 58 which in turn supports a drive gear 60 eccentrically mounted relative to shaft 42; the center of the gear 60 is defined as axis $A_3$ which is, of course, displaced from axis $A_2$. The gear 60 is suitably formed to mesh with an internal output gear 62 mounted on a shaft 64 on axis $A_4$ mounted in the frame 30 through bearings 66 and 68.

A cam follower 70 is eccentrically mounted on the sprocket 54, such that the center of the cam follower 70 is coincident with axis $A_3$, the center of gear 60. This cam follower 70 is confined in a groove 72 of a cam 74 mounted on shaft 64 through bearings 76 and 78. For normal operation of the mechanism described above, the groove 72 in cam 74 is a true circular arc about axis $A_4$ of a radius appropriate to maintain pitch line contact between gear 60 and internal gear 62.

The mechanism described to this point is the substantial equivalent to the mechanism shown in FIGS. 22, 23 and 24 of my existing U.S. Pat. No. 3,789,676, except that the means for maintaining a constant distance between axes $A_3$ and $A_4$ is now a cam follower 70 in an arcuate slot 72 rather than a link.

With an appropriate spacing between axes $A_2$ and $A_3$ the output movement of gear 62 and shaft 64 will come to a complete dwell or stop once for every revolution of gear 60 even though the input shaft 50 rotates at some constant angular velocity. It can be seen that as the shaft 50 on the fixed axis $A_1$ rotates, it drives the shaft 42, through sprockets 52 and 54 and chain 56, at some angular velocity about axis $A_2$. The gear 60 eccentrically mounted on shaft 42 also rotates at the same angular velocity about its own center axis $A_3$. The axis $A_2$ is maintained equidistant from the fixed axis $A_1$ by the link 36 and the axis $A_3$ is maintained equidistant from the fixed axis $A_4$ by the cam follower 70 in the arcuate slot 72. Therefore, as shaft 42 and gear 60 rotate about their respective axes $A_2$ and $A_3$, these two axes revolve about each other and the arm 36 must oscillate about the fixed axis $A_1$ and the cam follower 70 oscillates in the arcuate slot 72.

During the dwell portion of the cycle, the angular rotation of the gear 60 to drive gear 62 is precisely cancelled by the movement of axis $A_3$ about $A_2$. In effect, the motion of gear 60 is exactly described as rolling along the then stationary gear 62. If now during this "natural" dwell portion of the basic mechanism cycle the gear 60 is withdrawn from engagement with the gear 62, the dwell may be extended through one or more equivalent index times.

The mechanism to accomplish this disengagement and subsequent re-engagement will now be described. Referring again to FIGS. 1, 2, 3 and 4, the cam 74 is provided with sprocket teeth 80 through which it is driven by chain 82 and sprocket 84 mounted on shaft 50. Therefore, cam 74 rotates about the fixed axis $A_4$ as driven by the prime mover 48 in a fixed relationship with the rotation of the basic index mechanism. The cam 74 contains the arcuate slot sector 72 as previously described; it further contains an arcuate slot sector 86 having a smaller radius than the sector 72, the radius of sector 86 being of a value to shift the locus of axis $A_3$ through cam follower 70 closer to axis $A_4$ thereby disengaging gear 60 from gear 62. The arcuate slot sectors 72 and 86 are suitably blended with transition slot sectors 88 and 90.

Since the cam 74 rotates at a constant ratio with respect to shaft 50, it is obvious that the system may be synchronized such that the cam follower 70 engage the transition sector 90 at precisely the interval that the basic index system output is in dwell, thereby disengaging gear 60 from gear 62. It should be emphasized that during this natural dwell of the basic index system there is no relative driving motion from gear 60 to gear 62 and therefore disengagement or re-engagement is accomplished without shock, or velocity discontinuity.

During the interval that the cam follower 70 is guided by the slot sector 86, the basic index motions continue, except that gear 60 is not in engagement with gear 62 and there is therefore no output movement of gear 62. Shaft 42 continues to rotate about axis $A_2$ and gear 60 continues to rotate about axis $A_3$ while axis $A_2$ and axis $A_3$ rotate about each other; arm 36 oscillates about axis $A_1$, and axis $A_3$ and roller 70 oscillate in slot 86 at the reduced equidistant distance from $A_4$.

The sprocket ratios from sprocket 52 to sprocket 54 and sprocket 84 to sprocket 80 must be related such that the cam 74 makes one revolution while the gear 60 and shaft 42 make an integral number of revolutions. With the proportions shown in FIGS. 1, 2, 3 and 4, the cam 74 makes one revolution for each three revolutions of gear 60; and the output gear 62 makes a 90° index for each revolution of gear 60. The slots 72 and 86 in cam 74 are proportioned such that the index mechanism is operative for ⅔ of a revolution of cam 74 (equal to two revolutions of gear 60) and inoperative for ⅓ of a revolution of cam 74 (equal to one revolution of gear 60). Therefore, with the shaft 50 running continuously at a constant angular velocity, the behavior of the output gear 62 is as follows:

1. Output gear 62 indexes 90° (during one revolution of gear 60 and 120° rotation of cam 74) smoothly accelerating from a stop to maximum velocity, then smoothly decelerating to a stop;
2. Output gear 62 remains stationary for an interval of time equal to the time required for step one (while gear 60 makes one revolution but not driving and cam 74 rotates 120°);
3. Output gear 62 indexes 90° as in step 1;
4. Steps 1, 2, 3 repeat indefinitely.

This "program" therefore is: index, idle, index, index, idle, index, without end. If the slot sector 72 were decreased from 240° of cam 74 to 120° and the slot sector 86 were thereby increased from 120° to 240°, the program pattern would be changed to: index, idle, idle, index, idle, idle, etc. The number of programs possible with this arrangement is very large, and the only requirements are that the cam 74 make one revolution for some integral multiple number of revolutions of gear 60, and that the shift of gear 60 from engagement or disengagement with gear 62 occur during the natural dwell of the basic mechanism.

The addition of the programming mechanism, consisting primarily of cam follower 70 and cam 74 with its drive system, does not affect the inherent smoothness of the indexing behavior of the basic mechanism. Furthermore, since the engagement and disengagement of gear 60 and 62 occur during the interval that gear 62 is naturally stationary, the overall smoothness is exceptional.

Another embodiment of this same invention is shown in FIGS. 5, 6, 7 and 8. In this case, the programming of the basic mechanism is accomplished by a cam mounted on a separate fixed axis which rotates through one revolution for some integral number of revolutions of the drive gear. Additionally, a locking system is provided to maintain the position of the output gear when the driving gear is disengaged.

Referring to the FIGS. 5, 6, 7 and 8, a prime mover 100 is mounted on a base 102; this prime mover may be an electric motor, gear reducer combination, a high torque hydraulic motor, a shaft powdered from some portion of a larger mechanism, of which the subject mechanism is only a fractional part, or any other means capable of supplying the torque required. An output shaft 104 on axis $A_1$ driven by the prime mover 100 supports a link 106 through bearings 108 and 110; the other end of the link 106 in turn supports a shaft 112 on axis $A_2$ through bearings 114 and 116. Shaft 112 is driven by sprocket 118 mounted thereon, chain 120 and sprocket 122 mounted on shaft 104.

The other end of shaft 112 supports an eccentric cheek plate 124 which in turn supports an index gear 126 on axis $A_3$. It will be noted that axis $A_3$ and axis $A_2$ are displaced by a distance approximating the pitch radius of gear 126 (FIG. 7). A short stub shaft 128 is mounted to gear 126 concentric with it on axis $A_3$. The gear 126 meshes with and drives the output gear 130 rotating on fixed axis $A_4$ which is mounted on shaft 132, supported in bearings 134 and 136, which in turn are mounted in bracket 138 mounted to the base 102.

The shaft 128 on axis $A_3$ is guided in an arcuate slot 140 in guide block 142 which in turn is mounted on an arm 144. In one of its selectable positions, and as shown in FIGS. 5, 6, 7 and 8, the arm 144 is positioned such that the arcuate slot 140 is equidistant from axis $A_4$ at a radius such that gear 126 is maintained in driving engagement with gear 130 through the restraint of shaft 128 in slot 140.

This portion of the mechanism is substantially identical with that shown in FIGS. 14, 15 and 16 of my U.S. Pat. No. 3,789,676 except that in the present embodiment described above the fixed distance between axes $A_3$ and $A_4$ is maintained by the shaft 128 in arcuate slot 144, while in the referenced patent, this function is performed by a link journalled on axes $A_3$ and $A_4$. Therefore, as the shaft 104 rotates through some angle sufficient to cause one revolution of shaft 112, the output gear 130 moves through one index cycle, smoothly accelerating from a stop to a maximum velocity and then smoothly decelerating to a stop again.

During this single revolution of the shaft 112 about axis $A_2$ and the associated single revolution of gear 126 about axis $A_3$, the axis $A_2$ oscillates about the fixed axis $A_1$ and the axis $A_3$ oscillates about the fixed axis $A_4$ and axes $A_2$ and $A_3$ rotate about each other.

With the proper spacing between axes $A_2$ and $A_3$ the output gear will come to a stop for some usable interval once for each revolution of the gear 126. If during this interval, termed the natural dwell, the gear 126 is disengaged from the gear 130, the overall dwell of the gear 130 may be lengthened significantly. The remainder of the mechanism of FIGS. 5, 6, 7 and 8 illustrates another embodiment to perform this function.

The arm 144 is pivoted about a shaft 146 mounted in a riser bracket 148 supported from the base 102. An extension of the arm 144 supports a lock 150 consisting of a segment of internal gear suitably formed to fit into the gear 130. Referring to FIG. 5, the arm 144 is in a position to keep the gear 126 in mesh with gear 130; if now the arm 144 is rotated clockwise about the shaft 146 through an angle of approximately 2°, the gear 126 is disengaged from gear 130 and simultaneously the lock 150 moves into engagement with gear 130 maintaining it in a locked stationary position until the arm 144 is returned to the position shown by a counterclockwise rotation of approximately 2°. When this movement of the arm 144 from driving to non-driving or from non-driving to driving position occurs during the natural dwell of the basic mechanism the disengagement or re-engagement of the gear 126 with gear 130 takes place without a relative driving motion between these said gears. Similarly, the engagement or disengagement of the lock 150 occurs when the gear 130 is stationary.

This proper phasing of the movement of link 144 is generated by the following illustrative mechanism. A gear 152 mounted on the shaft 104 drives a gear 154 rotating on a fixed shaft 156 mounted in a riser bracket 158 on base 102. A control cam 160 is mounted to the gear 154; a cam follower 162 engages the cam 160; it is mounted on the follower arm 164 which is pivotally mounted on a shaft 166 in turn supported from riser bracket 168 on base 102 (FIG. 8). The arm 164 loads the cam follower 162 against cam 160 through torsion spring 170. A link 172 is pivotally connected to arm 164 at its one end and pivotally connected to arm 144 at its other end, thereby transmitting the cam controlled movement to arm 144.

With the proportions shown, the cam 160 will make one revolution for each two revolutions of the gear 126; since the cam is divided into two 180° sectors, the mechanism will cause the gear 126 to remain engaged with the gear 130 for one index cycle, then become disengaged for the equivalent of another index cycle, repeating this pattern endlessly.

During the interval that the arm 144 maintains the gear 126 disengaged from the gear 130, it will be noted that the shaft 128 will continue to oscillate in the slot 40, axis $A_2$ will continue to oscillate about axis $A_1$ and axes $A_2$ and $A_3$ will continue to rotate about each other. It will also be noted that the mechanism is capable of operating in either direction with the same characteristics.

A third embodiment of this same invention is shown in FIGS. 9, 10, 11, 12 and 13. In this instance, the basic indexing mechanism is an embodiment in which the intermittent output motion is generated by a system of chains and sprockets. Accordingly, the synchronous disengaging and re-engaging takes place between two adjacent sprockets rather than between the output gear and its associated drive gear as in the previous illustrative examples.

Referring to FIGS. 9 and 10, an output shaft 200 rotating on an axis $A_4$ is mounted in bearings 202 and 204 in a riser bracket 206 which in turn is supported from a frame 208. The output shaft 200 is driven by an output sprocket 210 mounted thereon; the output shaft 200 further supports a floating link 212 mounted to it through bearings 214 and 216. At its other end the link 212 supports a shaft 218 rotating on an axis $A_3$ through bearings 220 and 222. This shaft 218 is rigidly connected to a hub 224 mounted eccentrically on a sprocket 226 which in turn has a centerline axis $A_2$.

A sprocket 228 is journalled on shaft 218; a movable pin 230 fitted in the hub 224 is formed to engage a mating hole in this sprocket 228; when so engaged, as shown in FIG. 10, the pin 230 causes the sprocket 228 to rotate with the shaft 218 and hub 224. A drive chain 232 suitably formed to operate with sprockets 228 and 210 imparts rotation from sprocket 228 to sprocket 210.

The sprocket 226 is rigidly connected to a shaft 234 also rotating on axis $A_2$; this shaft 234 is connected to a link 236 through a bearing 238. At its other end, the link 236 is rotatably connected to the input shaft 240 of the system on a fixed axis $A_1$. A sprocket 242 mounted on the input shaft 240 imparts rotation through a chain 224 to the sprocket 226. The shaft 240 in turn is driven by some suitable prime mover 246 mounted on the base 208.

The mechanism as described to this point is substantially identical with the mechanism shown in FIGS. 25, 26 and 27 in my U.S. Pat. No. 3,789,676. In normal operation, the input shaft 240 drives the sprocket 226 through chain 244 which in turn causes the sprocket 228 to drive the sprocket 210 through chain 232. The axis $A_2$ oscillates about axis $A_1$ as constrained by link 236 and the axis $A_3$ oscillates about axis $A_4$ as constrained by link 212; and axes $A_2$ and $A_3$ rotate about each other. With the proper distance between axes $A_2$ and $A_3$ relative to the other geometrical parameters, the sprocket 210 will come to a periodic stop once for each revolution of sprockets 226 and 228, even though the input shaft 240 rotates continuously.

If during such a periodic stop of the sprocket 210, the pin 230 is displaced from its driving position between sprocket 228 and hub 224, the sprocket 228 will rotate freely on shaft 218 and no further indexes of the sprocket 210 takes place. However, once during each rotation of the sprocket 226 there is reached an interval during which there is no relative motion between sprocket 228 and hub 224; at such a time, the pin 230 may be re-engaged between sprocket 228 and hub 224.

Stated another way, if there is no driving connection beetween sprocket 228 and hub 224 and if sprocket 210 is stationary, then once during each rotation of hub 224, there occurs an interval during which there is no relative rotation between sprocket 228 and hub 224, and this interval corresponds to that interval during which the sprocket 210 would be in dwell if there were a driving connection between sprocket 228 and hub 224.

Therefore, it may be seen that if the pin 230 is moved from its driving to non-driving position or from its non-driving to driving position during these natural dwell intervals, its engagement or disengagement will be between two members which during that time experience no relative motion and the shift creates no shock or lack of smoothness.

An illustrative mechanism to accomplish this synchronous shifting of the pin 230 will now be described. A sprocket 248 is journalled on shaft 234 through bearings 250; this sprocket 248 is driven by sprocket 252 on input shaft 240 through chain 254. If the ratio between sprocket 252 and 248 is different from the ratio between sprockets 242 and 226 which rotate on the identical axes, there occurs a relative rotation between sprockets 248 and 226.

An axial cam surface 256, 258, 260, 262 is attached to or made integral with one face of the sprocket 248 as shown in FIG. 11; this cam surface 256-262 is used to control the axial position of the pin 230 which is spring loaded against the cam as shown in FIGS. 12 and 13. The pin 230 is slidably fitted into the hub 224 and sprocket 226. A clearance pocket 264 is formed in the hub 224; a cantilever spring 266 is fastened to one face of sprocket 226 through spacer 268. This spring extends through the pocket 264 and engages a slot 270 in the pin 230 and exerts an elastic force on the pin 230 against the controlling cam face 256–262.

As the sprocket 248 rotates relatively to sprocket 226 on axis $A_2$, the cam ramp 256 engages the pin 230 and drives it axially into engagement with sprocket 228 deflecting spring 266. With further relative rotation of sprocket 248 with respect to sprocket 226, the pin 230 engages ramp 260, permitting the spring 266 to move the pin 230 out of engagement with sprocket 228.

It may be seen, therefore, that if the ramps 256 and 260 are properly positioned, the axial movement of pin 230 can be synchronized to occur during the natural dwells of the basic indexing mechanism. It may further be seen that a wide variety of index dwell patterns may be established through the specific design of cam surfaces 256–262 and the ratio between sprockets 248 and 252.

The embodiment described in FIGS. 9–13 may be employed with other chain driven systems and may also be used with the gear driven systems.

In each of the embodiments described above, the control of the engaging and disengaging is accomplished mechanically through a programming type cam. The actuation of any specific engagement disengagement mechanism may also be accomplished by a cylinder or solenoid using common practices. Such a cylinder or solenoid operated mechanism would be controlled by a suitable synchronizing signal created by a limit switch and/or valves operated by a limit switch or valve actuating cam mounted on axes $A_1$, $A_2$ or $A_3$, again using widespread common practice.

The essential characteristics common to all of the foregoing embodiments may be summarized as follows:

1. A basic indexing mechanism characterized through its attainment of an intermittent output motion from a constant input motion where such intermittent output steps or indexes are separated by interposed short dwells and such intermittent output motion is achieved by components constantly in engagement and the periodic dwell characteristic is created through the superposition of two or more velocity components which periodically cancel to cause a stoppage of the output member. One example of such a basic family of mechanisms is described in my U.S. Pat. No. 3,789,676. Another such family of mechanisms which achieves a greater dynamic flexibility through the further addition of a controlled second harmonic is illustrated by my separate U.S. patent application, Ser. No. 444,024, filed Feb. 20, 1974, and a third family of mechanisms to which my present invention is applicable is illustrated by my separate U.S. patent application, Ser. No. 474,947, filed May 31, 1974.

2. A timing means driven by the input member with substantial proportionality.

3. A means of engaging and disengaging two adjacent members of the overall drive train at a time when the output member is in its natural dwell created by the basic mechanism and the aforementioned two adjacent drive members experience no relative driving movement between themselves.

4. A means to control and confine the separation and subsequent re-engagement of the aforesaid two adjacent members to that specific interval when these members experience no relative driving movement between themselves and the output member is in its natural dwell.

5. Optionally, the means which controls the separation and re-engagement of the two separable adjacent members may further activate a lock on the output member during the interval that the separable members are disengaged.

I claim:

1. In a basic intermittent indexing mechanism comprising a frame, an input member, an output member and a plurality of intermediate driving members having a driving connection between each adjacent pair of said members, of the type which generates a periodic dwell interval of said output member through the kinematic superposition of substantially linear and substantially harmonic oscillating motion components including those which include multiple harmonic components, a dwell extension mechanism which comprises:
   a. timing means driven by said input member with substantial proportionality,
   b. means for engaging and disengaging one of said driving connections,
   c. actuator means connecting said timing means and said means for engaging and disengaging, said actuator means being synchronized to effect said disengagement with one of said periodic dwell intervals of said basic intermittent indexing mechanism and re-engagement within another of said periodic dwell intervals.

2. In a basic intermittent indexing mechanism comprising a frame, an input member, an output member and a plurality of intermediate driving members having a driving connection between each adjacent pair of said members, of the type which generates a periodic dwell interval of said output member through the kinematic superposition of substantially linear and substantially harmonic oscillating motion components including those which include multiple harmonic components, a dwell extension mechanism which comprises:
   a. cam means driven by said input member with substantial proportionality,
   b. means for engaging and disengaging one of said driving connections, and
   c. cam follower means for connecting said cam means and said means to effect said engaging and disengaging, said cam follower means being disposed to effect said disengagement within one of said periodic dwell intervals of said basic intermittent indexing mechanism and re-engagement within another of said periodic dwell intervals.

3. In a basic indexing mechanism comprising a frame, an input member, an output gear member, a driver gear member in tangential driving engagement with said output gear member and a plurality of driving members between said input member and said driver gear member, of the type which generates a periodic dwell interval of said output gear member through the kinematic superposition of substantially linear and substantially harmonic oscillating motion components including those which include multiple harmonic components, a dwell extension mechanism which comprises:
 a. cam means driven by said input member with substantial proportionality,
 b. means for engaging and disengaging said driver gear member with said output gear member, and
 c. cam follower means connecting said cam means and said means to effect said engaging and disengaging, said cam follower means being disposed to effect said disengagement within one of said periodic dwell intervals of said basic intermittent indexing mechanism and reengagement within another of said periodic dwell intervals.

4. In a basic intermittent indexing mechanism comprising a frame, an input member, an output sprocket member, a first intermediate sprocket member, a drive chain between said output sprocket member and said first intermediate sprocket member, a second intermediate sprocket member eccentrically mounted to said first intermediate sprocket member and a plurality of driving members between said input member and said second intermediate sprocket member, of the type which generates a periodic dwell interval of said output sprocket member through the kinematic superposition of substantially linear and substantially harmonic oscillating components including those which include multiple harmonic components, a dwell extension mechanism which comprises:
 a. cam means driven by said input member with substantial proportionality,
 b. means for engaging and disengaging said first intermediate sprocket and said second intermediate sprocket, and
 c. cam follower means connecting said cam means and said means to effect said engaging and disengaging, said cam follower means being disposed to effect said disengagement within one of said periodic dwell intervals of said basic intermittent indexing mechanism and re-engagement with another of said periodic dwell intervals.

5. An indexing mechanism as defined in claim 1 in which:
 a. said timing means comprises a cam slot in a rotating member,
 b. said output member has an internal gear surface,
 c. a drive gear to engage said internal gear surface,
 d. means mounting said drive gear to move from a position of engagement with said internal gear surface to a position of disengagement, and
 e. said actuator means comprising a cam follower engageable in said cam slot movable to shift said drive gear to said respective engagement and disengagement positions.

6. An indexing mechanism as defined in claim 1 in which:
 a. said output member has an external gear surface,
 b. a drive gear to engage said external gear surface,
 c. said means for engaging and disengaging said driving connection comprising a lever mounting said drive gear and pivotally movable to shift said drive gear to a position of engagement and a position of disengagement,
 d. said timing means comprising a cam surface on a rotary element driven by said input member,
 e. said actuator means comprising cam follower means to engage said cam surface, and
 f. means connecting said cam follower means and said lever to shift said drive gear from engagement to disengagement.

7. An indexing mechanism as defined in claim 1 in which:
 a. said output member is driven from a sprocket by a chain,
 b. a rotating intermediate member adjacent said sprocket,
 c. said means for engaging and disengaging one of said driving connections comprising a pin movable axially relative to said sprocket and rotating intermediate member to connect and disconnect, and
 d. said actuator means comprising a cam on one of said driving members positioned to contact said pin at intervals to cause connection and disconnection of said sprocket and said intermediate member.

* * * * *